(12) United States Patent
Sang

(10) Patent No.: US 6,724,769 B1
(45) Date of Patent: Apr. 20, 2004

(54) APPARATUS AND METHOD FOR SIMULTANEOUSLY ACCESSING MULTIPLE NETWORK SWITCH BUFFERS FOR STORAGE OF DATA UNITS OF DATA FRAMES

(75) Inventor: Jinqlih Sang, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/401,187

(22) Filed: Sep. 23, 1999

(51) Int. Cl.[7] .............................................. H04L 12/56
(52) U.S. Cl. ....................................... 370/429; 370/412
(58) Field of Search ................................ 370/389, 401, 370/360, 412, 428, 429, 507; 711/128, 151; 709/215, 216, 213

(56) References Cited

U.S. PATENT DOCUMENTS 6,058,459 A * 5/2000 Owen et al. ................ 711/151
6,292,870 B1 * 9/2001 Ishizuka et al. ............ 711/128

* cited by examiner

Primary Examiner—Kenneth Vanderpuye

(57) ABSTRACT

Multiple network switch modules have memory interfaces configured for transferring packet data to respective buffer memories. The memory interfaces are also configured for transfer among each other data units of data frames received from different network switch modules. The memory interfaces transfer the data units according to a prescribed sequence, optimizing memory bandwidth by concurrently executing a prescribed number of successive memory writes or memory reads. An alternative embodiment includes a distributed memory interface in between the network switch modules and a shared memory system, where the width of the data bus of the shared width memory system equals the total number of bits on the data buses of the switch modules.

9 Claims, 5 Drawing Sheets

| TIME INT. | 1 | 2 | 3 | 4 | 5 | 6 | 7 | 8... |
|---|---|---|---|---|---|---|---|---|
| SWITCH 12a | $A_{11}$ | $B_{21}$ | $C_{31}$ | $D_{41}$ | X | X | X | $E_{11}$ |
| SWITCH 12b | | $A_{12}$ | $B_{22}$ | $C_{32}$ | $D_{42}$ | X | X | $E_{12}$ |
| SWITCH 12c | | | $A_{13}$ | $B_{23}$ | $C_{33}$ | $D_{43}$ | X | $E_{13}$ |
| SWITCH 12d | | | | $A_{14}$ | $B_{24}$ | $C_{34}$ | $D_{44}$ | $E_{14}$ |

APPARATUS AND METHOD FOR SIMULTANEOUSLY ACCESSING MULTIPLE NETWORK SWITCH BUFFERS FOR STORAGE OF DATA UNITS OF DATA FRAMES

FIELD OF THE INVENTION

The present invention relates to computer network interfacing and switching, and more particularly, to an apparatus and method for cascading multiple multiport network switches to increase the number of ports in a network switching arrangement.

BACKGROUND ART

A multiport network switch in a packet switching network is coupled to stations on the network through its multiple ports. Data sent by one station on a network to one or more other stations on the network are sent through the network switch. The data is provided to the network switch over a shared access medium according to, for example, an Ethernet protocol. The network switch, which receives the data at one of its multiple ports, determines the destination of the data frame from the data frame header. The network switch then transmits the data from the appropriate port to which the destination network station is connected.

A single Ethernet network switch may have a number of 10/100 Mb/s ports, equaling, for example, 12 ports. The number of end stations connected to the single network switch is limited by the number of ports (i.e., port density) of the network switch. However, today's users of networking devices demand flexibility and scalability without such constraints. To address this need, manufacturers have developed modular architectures that enable cascading of identical networking devices or network switch modules. By cascading these equipment (or components) in a loop, port density can be readily increased without redesign or development of costly interfaces.

Unfortunately, as the number of cascaded switches increases, so does the system latency (i.e., the aggregate processing delay of the switches). This system latency is attributable in part by the manner in which the switches store and retrieve the data frames in memory. One traditional memory architecture employs individual, local memories for each cascaded switch, as shown in FIG. 1. In this example, three multiport switches 12a, 12b, and 12c are cascaded together to permit the exchange of data frames received by any one of the switches and subsequent forwarding of the data frames out of a different multiport switch. These switches 12a, 12b, and 12c have a memory interface, e.g., 44a, 44b, and 44c, respectively. These memory interfaces 44a, 44b, and 44c enable switches 12a, 12b, and 12c to access their respective memories 601a, 601b, and 601c to write and read the data frames.

For purposes of explanation, it is assumed that a data frame is received a port (i.e., receive port) on switch 12a and that the data frame is destined for a node attached to a port on a different switch 12c. Switch 12a first stores the received data frame in memory 600a, and then determines whether to forward the received data frame out of its own port or send it to the next switch in sequence. Because the data frame is not destined to any port of switch 12a, the data frame is retrieved from memory 600a and sent to the next switch 12b via switch 12a's cascade port (i.e., the port to which the neighboring switches is connected). Upon receiving the data frame, switch 12b stores the data frame in memory 600b.

Next, switch 12b examines the data frame and determines that it should be forwarded to switch 12c. Switch 12b forwards the data frame to switch 12c by reading the stored received data frame from memory 600b and sending it out its cascade port. When the data frame arrives at switch 12c, switch 12c writes the data frame into its memory 600c, in similar fashion as the other switches 12a and 12b. At this point, however, switch 12c determines that the data frame should be forwarded out one of its ports, which is connected to the destination node. Accordingly, switch 12c reads the stored data frame and forwards it out the appropriate port. As evident by this example, the data frame, as it is transferred from switch to switch is stored and read numerous times into the memories of the respective switches. The series of write and read operations impose cost delay in the switching system.

Hence, the delay in the switching system may cause the switch to be unable to process data packets fast enough relative to the network traffic, creating congestion conditions. In other words, the switch is no longer a non-blocking switch.

To address this latency problem, one proposed solution is to employ a common memory among the various switches. FIG. 2 illustrates such a system in which switches 12a, 12b, and 12c shared memory 701 via memory interfaces 44a, 44b, and 44c, respectively. Under this approach, each of the interfaces 44a, 44b, and 44c are required to have a wider data bus to maintain the speed of read and write accesses as compared to the individual memory arrangement of FIG. 8. For example, the bus width of the memory interfaces 44a, 44b, and 44c may need to increase to 128 bits. The main drawback with this common memory implementation is that the increase in memory bandwidth also results in a proportionate increase in the number of pins of the switches. An increase in the number of pins disadvantageously require more area on the circuit board, resulting in greater package cost.

SUMMARY OF THE INVENTION

There is need for cascading a plurality of multiport switches to increase port density, while minimizing system latency. There is also a need to increase memory bandwidth of the cascaded switch arrangement without increasing the number of pin counts.

These and other needs are obtained by the present invention, where a plurality of switch modules transfer frame data of a corresponding received frame as data units. The memory interface enables the transfer of data units between the multiport switch modules and a shared memory system, increasing the overall bandwidth between the memory system and the multiport switch module by the simultaneous access of multiple memories for transfer of multiple data units for a respective packets.

One aspect of the present invention provides a switching system. The switching system includes a plurality of buffer memories, and a plurality of multiport switch modules. Each multiport switch module includes a memory interface configured for outputting a data unit of a corresponding data frame being received, to one of a corresponding one of the buffer memories and another one of the multiport switch modules. The multiport switch modules are configured for supplying a group of the data units to the plurality of buffer memories, simultaneously during said each memory access cycle according to a prescribed access protocol.

Since each of the multiport switch modules supply the data units of the corresponding receive data frame to the plurality of buffer memories, each buffer memory may store frame data for different multiport switch modules. Moreover, the transfer of the data units according to prescribed access protocol enables concurrent and simultaneous access of all the buffer memories, enabling a higher overall effective memory bandwidth between the multiport switch modules and the plurality of buffer memories. One exemplary embodiment of this aspect involves transfer of the data units between memory interfaces according to prescribed access protocol, enabling the switch module to fully optimize data transfer between the multiport switch modules and buffer memories. Another exemplary embodiment of this aspect uses a distributed memory interface, which receives the data units each of the multiport switch modules and stores the data units in the buffer memories according to the prescribed access protocol. Hence, the memory bandwidth is substantially increased without increasing the pin count of the switch modules.

Another aspect of the present invention provides a method of storing data frames received by respective network switch modules. The method comprises scheduling in each network switch module a transfer of a data unit of a corresponding data frame being received, to one of a corresponding buffer memory and another one of the network switch modules each memory access cycle, and simultaneously supplying by the network switch modules the data units to the plurality of buffer memories.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numerals represent like elements throughout and wherein.

BEST MODE FOR CARRYING OUT THE INVENTION

Switch Architecture Overview

Figure 1:
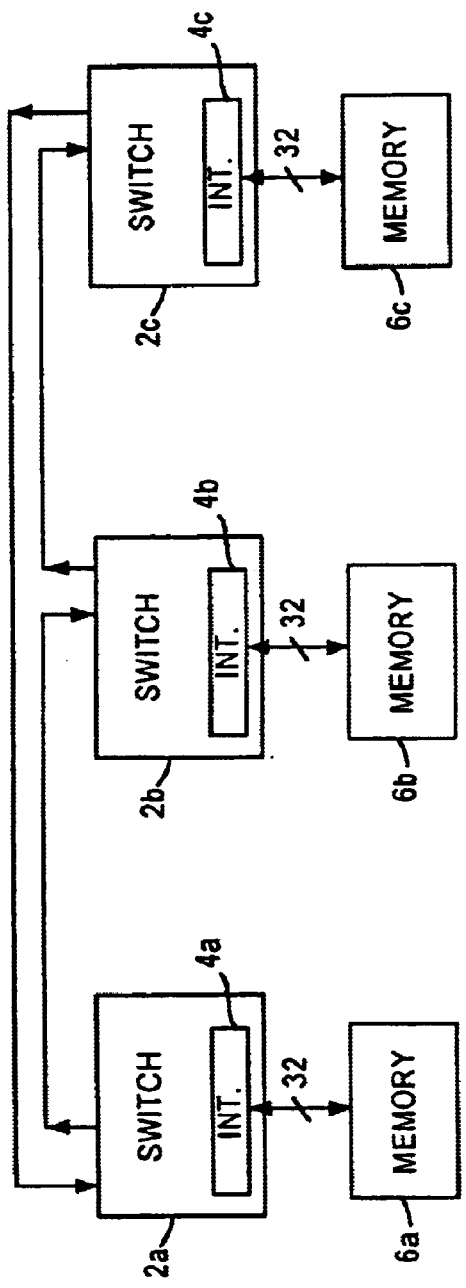
FIG. 1 is a block diagram illustrating a conventional switching arrangement that cascades multiple switch modules.
Figure 2:
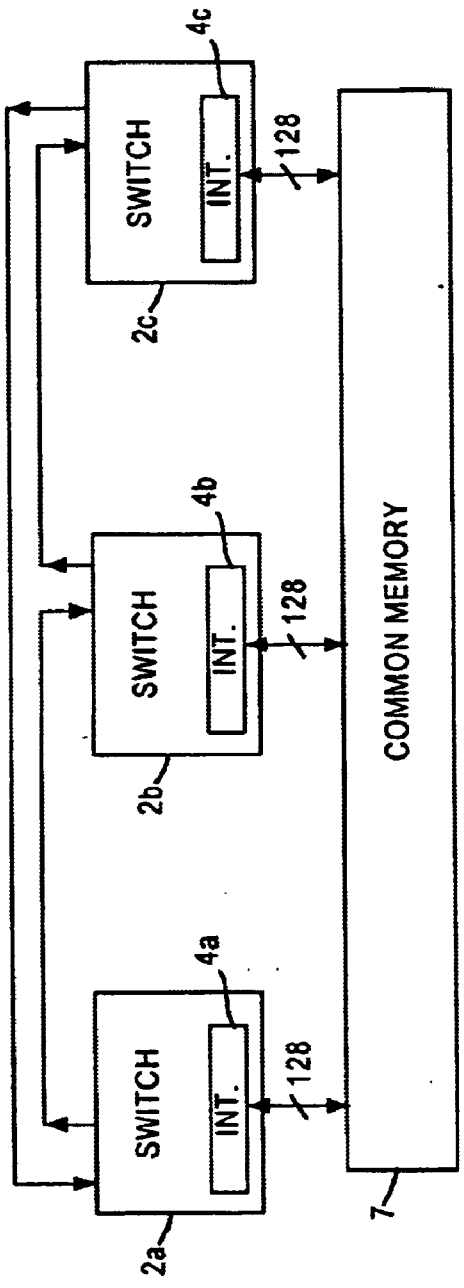
FIG. 2 is a diagram illustrating a alternative prior art arrangement using cascaded switching modules to store data frames in a common memory.
Figure 3:
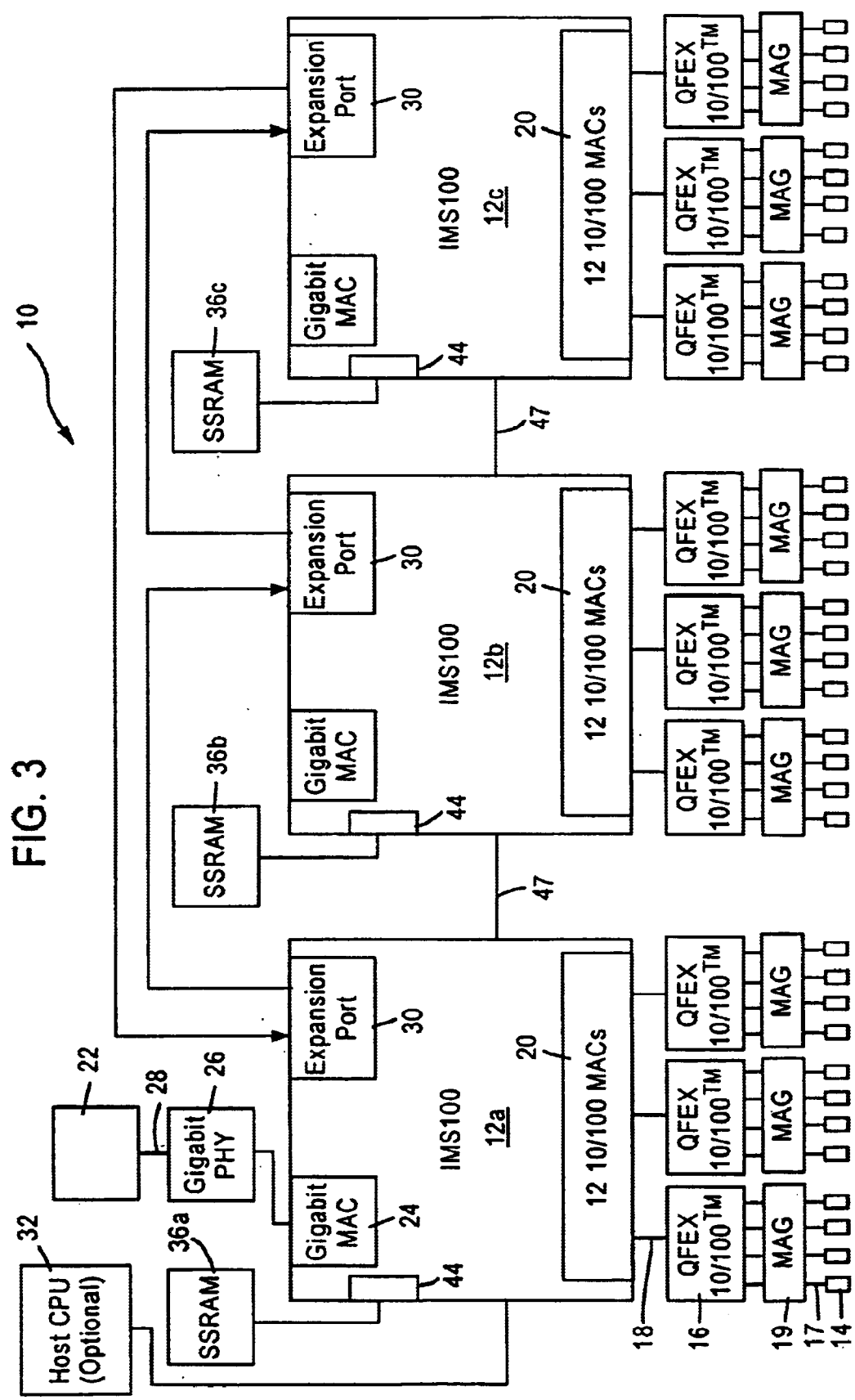
FIG. 3 is a diagram illustrating a switching system according to an embodiment of the present invention.

FIG. 3 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface device that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network

Simultaneous Memory Access Using Distributed Memory Interface

The present invention is directed to a network switch arrangement that has the capability to provide high port densities while minimizing system latency. Multiple network switches are cascaded together in a loop to support high port requirements; these switches utilize a distributed memory interface architecture to increase memory bandwidth. This architecture advantageously permits the simultaneous sharing of memories across multiple switches without an increase in pin counts.

Figure 4:
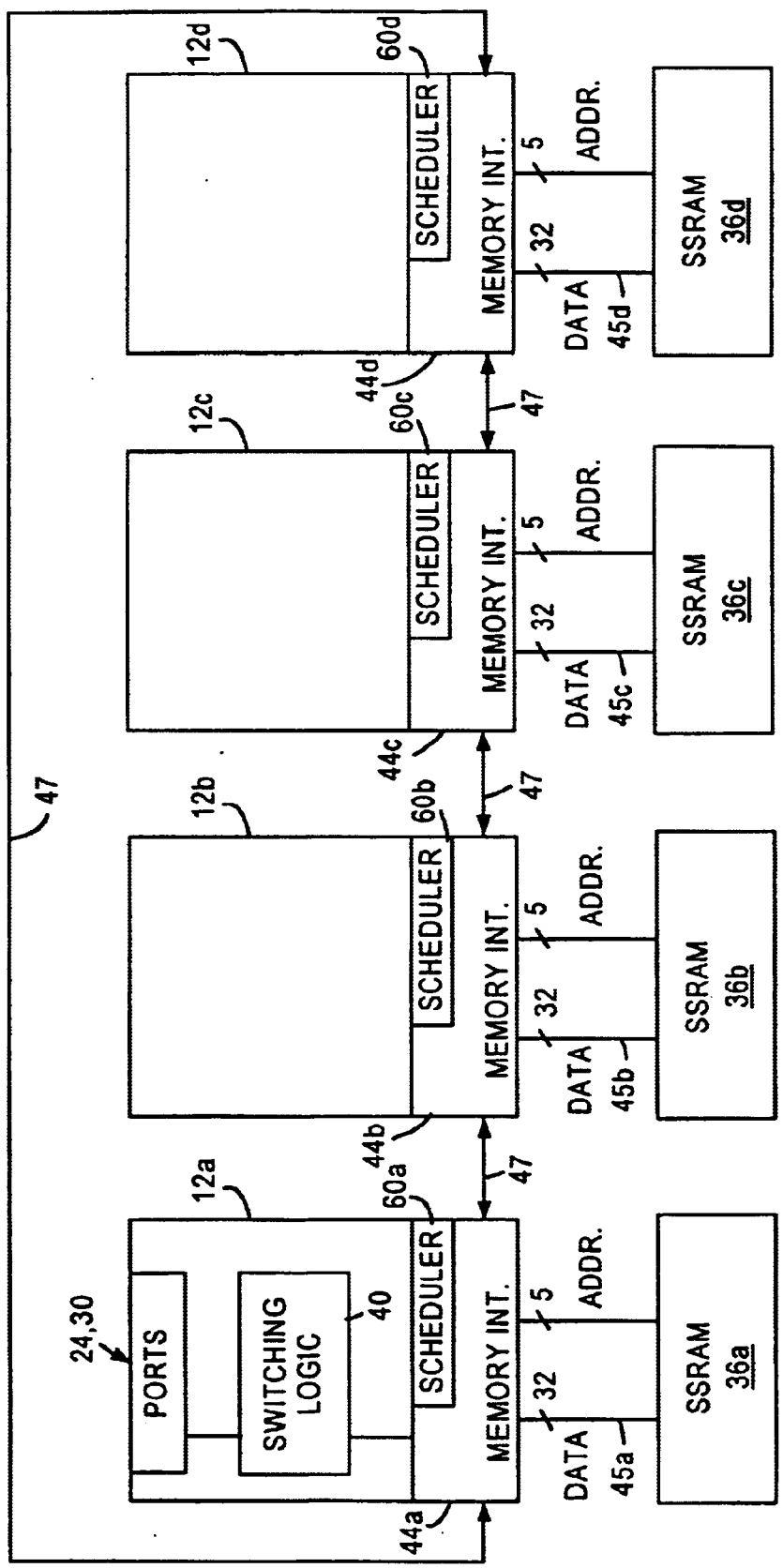
FIG. 4 is a block diagram in further detail the switching system of FIG. 3 including the memory interface.

FIG. 4 is a block diagram of the switching system of FIG. 3 in further detail according to an embodiment of the present invention. As shown in FIG. 4, each multiport switch module 12 includes a memory interface 44 for outputting frame data of a corresponding received data frame as a data unit onto a data bus 45 having a prescribed bit width, for example 32 bits. As described below, each of the buffer memories 36 are configured for storing a data unit of data frames received from each of the multiport switch modules. For example, SSRAM 36a is configured for receiving frame data as data units for data frames received by each of the switch modules 12a, 12b, 12c, and 12d. Each memory interface 44 of FIG. 4 is configured for transferring each 32-bit data unit of frame data for a data packet either to the corresponding buffer memory 36, or to another one of the memory interfaces 44 via a memory interface link 47 for transfer to another buffer memory 36. For example, a first 32-bit data unit of a data packet may be transferred by the memory interface 44a to the SRAM 36a, although the next 32-bit data unit for the same data packet may be transferred by the memory interface 44a to the memory interface 44b; the memory interface 44b, in response to receiving the data unit from the memory interface 44a, may either transfer the received data unit to the buffer memory 36b via the corresponding data bus 45b, or further forward the received data unit to another memory interface 44c via the memory interface link 47 according to a prescribed access protocol.

Each of the memory interfaces 44 includes a scheduler 60. The scheduler 60 controls the writing and reading of data units between the plurality of buffer memories according to the prescribed access protocol, described in detail below with respect to FIG. 6. In particular, each scheduler 60 determines whether a given data unit should be transferred to the corresponding memory 36, or should be transferred to another memory interface 44.

Figure 5:
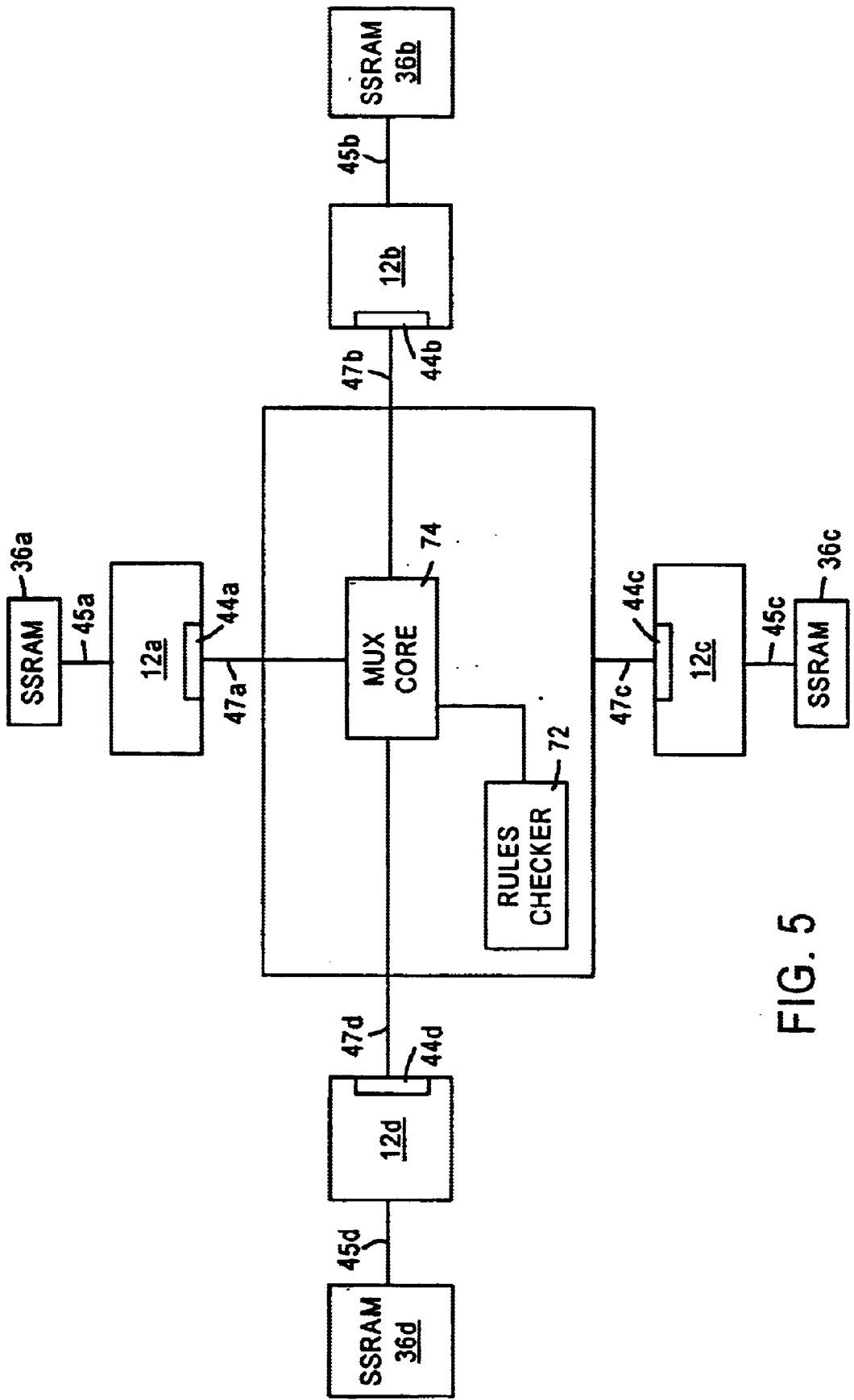
FIG. 5 is a block diagram illustrating the switching system including the distributed memory interface according to an alternative embodiment of the present invention.

FIG. 5 is a block diagram illustrating a switching system for storing data frames according to an alternative embodiment of the present invention. In contrast to FIG. 4, the memory interfaces 44 of FIG. 5 transfer all data units via the respective 32-bit data buses (i.e., switch data buses) 45 to a distributed memory interface 70, which includes a scheduler 72, and a plurality of elasticity buffers 74. The buffer scheduler 72 is configured for storing the data units in the elasticity buffers 74 during transfer of the data units between the multiport switch modules 12 and the buffer memories 36.

The distributed memory interface 70 transfers packet data for a given data frame each memory access cycle via the data bus 76, effectively increasing the overall memory bandwidth to 128 bits for a given data frame. As described below with respect to FIG. 6, the schedule 72 controls the storage of data units in the elasticity buffers 74 according to a prescribed access protocol.

Figures 6, 7:
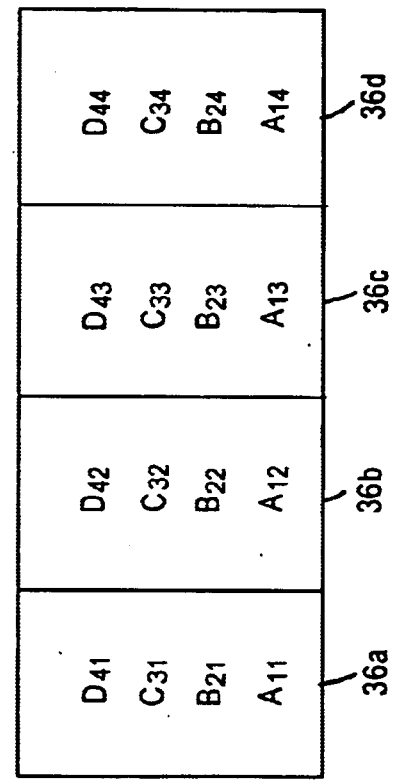
FIG. 6 is a diagram illustrating a prescribed memory access protocol used by the memory interfaces for simultaneous transfers according to an embodiment of the present invention.
FIG. 7 is a diagram illustrating the storage of data segments in different buffers according to the protocol of FIG. 6.

FIG. 6 is a diagram illustrating a prescribed access protocol for use by the schedulers 60 and 72 for transfer of frame data on a data unit basis according to an embodiment of the present invention. Assume in FIG. 6 that multiport switch modules 12a, 12b, 12c, and 12d receive data packets A, B, C and D beginning at time intervals 1, 2, 3, 4, respectively. Each time interval of FIG. 6 corresponds to 32 bit-times (i.e., the amount of time necessary for a network switch module 12 to receive 32 bits of frame data from the network). As shown in FIG. 6, the switch module 12a begins receiving packet A during time interval 1. Assuming no latency issues, the memory interface 44a begins transfer of a 32-bit data unit $A_{11}$ onto its corresponding data bus 45a. In the case of FIG. 4 the scheduler 60a controls the memory interface 44a to transfer the data unit $A_{11}$ to the SRAM 36a. In the case of FIG. 5, the memory interface 45a outputs all the frame data of data packet A to the distributed memory interface 70 via the data bus 45a, and the scheduler 72 stores the frame data $A_{11}$ in elasticity buffer $74_{11}$.

During the next time interval (2), the switch module 12a is receiving the second data unit of packet A while switch module 12b is receiving the first 32 bit data unit of data packet B. As shown in FIG. 6, the prescribed protocols of FIGS. 4 and 5 cause the second data unit of packet A ($A_{12}$) to be transferred to another memory interface (e.g., 44b) and stored in SRAM 36b in FIG. 4, and stored in elasticity buffer $74_{12}$ in FIG. 5. At the same time, the first data unit $B_1$ received by switch module 12b is transferred by memory interface 44b in FIG. 4 to memory interface 44a for transfer to the SRAM 36a during that same clock cycle and simultaneously with the transfer to SRAM 36b.

During time interval 3, with reference to FIG. 4, the first 32-bit data unit of data packet C, received by switch module 12c, ($C_{31}$) is stored in SRAM 36a, the second data unit of data packet B ($B_{22}$) is stored in SRAM 36b, and the third data unit of data packet A ($A_{13}$) is stored in SRAM 36c simultaneously by memory interface controllers 44a, 44b, and 44c, respectively. Note that data unit $C_{31}$ is transferred from controller 44c to controller 44a, and data unit $A_{13}$ is transferred from controller 44a to controller 44a. With respect to FIG. 5, the scheduler 72 during time interval 3 stores the data units $C_{31}$, $B_{22}$, and $A_{13}$ in elasticity buffers $74_{31}$, $74_{22}$, and $74_{13}$, respectively. Hence, the schedulers of FIGS. 4 and 5 control the transfer of data units between the memory interface controllers 44 according to a prescribed access protocol.

At time interval 4, referring to FIG. 4, switch module 12d begins reception of the first data unit $D_{41}$ of data packet D which is transferred by memory interface 44d to memory interface 44a for storage in SRAM 36a. The second, third, and fourth data units of data packets C, B, and A ($C_{32}$, $B_{23}$, $A_{14}$) are also simultaneously transferred to memory interfaces 44b, 44c, and 44d for storage in the buffer memories 36b, 36c, and 36d, respectively. The schedulers 60 of FIG. 4 provide multiple concurrent transfers of data units to the buffer memories 36, maximizing the memory bandwidth between the memory interfaces 44 and the respective buffer memories 36. Since the greatest disruption to memory bandwidth is the requirement of a turnaround cycle between reads and writes on a memory data bus, the schedulers 60 control the memory interfaces 44 to successively write to the buffer memories 36 data units for a prescribed successive number of memory access cycles before switching to reading of data from the memories for another successive prescribed number of access cycles. Hence, the number of delays due to turnaround cycles on the data buses 45 are minimized.

The same prescribed number of successive reads or writes occurs in FIG. 5 to optimize the bandwidth of the data buses 45. As shown in FIG. 5, the elasticity buffers 74 are configured for storing the data units until a sufficient number of data units for a selected data frame are received for transfer via the four 32-bit data buses 76*a*, 76*b*, 76*c*, and 76*d* to the shared memory buffers 36*a*, 36*b*, 36*c*, and 36*d*, respectively. Hence, the first four data units for data packets A, B, C, and D are simultaneously written at time intervals 4, 5, 6, and 7, respectively. FIG. 7 illustrates the storage of the data segments after time interval 7 in the different buffers 36. As described above, the distributed memory interface 70 will write packet data for a successive prescribed number of access cycles to minimize the occurrence of turnaround cycles between read and write cycles. As shown in FIG. 6, the distributed memory interface 70 reads a data frame E from the shared memory system 78 in time interval 8 and stores the retrieved frame data in one of the elasticity buffers 74, enabling at least one of the switch modules 12 to receive the frame data via the corresponding data bus 45 over the next four access cycles.

According to the disclosed embodiment, memory bandwidth is optimized by distributed storage of packet data across memory devices, where simultaneous data transfers occur of the memory devices. The memory interfaces 44 also may share frame pointer data, etc. enabling the switching logic 40 of each of the different switch modules 12 to identify the location of each of the data packets received by other switch modules. Hence, any one of the switch modules may obtain the frame data in an efficient manner, even if the frame data needs to be transferred to anther switch module that did not originally receive the data packet via a network port.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A switching system comprising:
   a plurality of buffer memories, and
   a plurality of multiport switch modules, each having a memory interface configured for outputting a data unit of a corresponding data frame being received, to one of a corresponding one of the buffer memories and another one of the multiport switch modules, the multiport switch modules configured for supplying a group of the data units to the plurality of buffer memories simultaneously during said each memory access cycle according to a prescribed access protocol;
   wherein the memory interfaces transfer the data units to each other via a memory interface link.

2. The system of claim 1, wherein each memory interface comprises a scheduler for controlling writing and reading of the data units between the plurality of buffer memories according to the prescribed access protocol.

3. The system of claim 2, wherein each memory interface has a prescribed round robin position according to the prescribed access protocol, wherein the data units of a corresponding data frame are successively written into the respective buffer memories according to a prescribed round robin protocol.

4. The system of claim 3, wherein each memory interface successively transfers a data unit from each of the multiport switch modules according to the prescribed round robin protocol.

5. A method of storing data frames received by respective network switch modules, the method comprising:
   scheduling in each network switch module a transfer of a data unit of a corresponding data frame being received, to one of a corresponding buffer memory and another one of the network switch modules each memory access cycle; and
   simultaneously supplying by the network switch modules the data units to the plurality of buffer memories;
   wherein the scheduling step includes selectively supplying the data unit during said each memory access cycle to a selected one of the network switch modules based on a prescribed protocol.

6. The method of claim 5, wherein the selectively supplying step includes supplying the data unit according to a round robin protocol as the prescribed protocol.

7. The method of claim 6, wherein the selectively supplying step includes supplying the data unit to the selected network switch module via a memory interface link.

8. The method of claim 5, further comprising successively outputting, by the network switch modules, respective portions of the received data frames to the respective memories for a prescribed number of memory access cycles according to a prescribed protocol between the network switch modules.

9. The method of claim 8, Wherein the successively outputting step includes outputting to each buffer memory, during each of the successively memory access cycles, a data unit from a different one of the network switch modules.

\* \* \* \* \*